United States Patent [19]

Roof et al.

[11] 4,441,063

[45] Apr. 3, 1984

[54] PULSE GENERATING SYSTEM

[75] Inventors: Richard W. Roof, Lexington, S.C.; Kenneth S. Berton, Monroeville, Pa.

[73] Assignee: Square D Company, Palatine, Ill.

[21] Appl. No.: 147,415

[22] Filed: May 6, 1980

[51] Int. Cl.$^3$ ............................................. H02P 7/42
[52] U.S. Cl. .................................... 318/722; 318/802; 318/809
[58] Field of Search .................... 323/108; 363/149; 307/106, 210, 262, 271; 318/722, 723, 724, 799, 800, 801, 802, 807, 808, 809; 328/55, 31, 61, 63

[56] References Cited

U.S. PATENT DOCUMENTS

| | | | |
|---|---|---|---|
| 3,509,476 | 4/1970 | Roth | 307/210 |
| 3,781,706 | 12/1973 | Osborne et al. | 363/149 X |
| 3,849,671 | 11/1974 | Molack | 307/210 X |
| 3,983,498 | 9/1976 | Malek | 328/55 X |
| 4,013,969 | 3/1977 | Dennison | 328/55 X |
| 4,059,842 | 11/1977 | Meacham | 323/63 X |
| 4,070,604 | 1/1978 | Usry | 318/724 X |
| 4,074,174 | 2/1978 | Kuge | 318/799 X |
| 4,081,735 | 3/1978 | Bray | 318/799 X |
| 4,099,107 | 7/1978 | Eder | 318/802 |
| 4,158,801 | 6/1979 | Hirata | 318/801 |
| 4,220,895 | 9/1980 | Nuver | 328/61 X |
| 4,308,491 | 12/1981 | Joyner, Jr. et al. | 318/732 |

Primary Examiner—David Smith, Jr.
Assistant Examiner—Richard M. Moose
Attorney, Agent, or Firm—Michael J. Femal

[57] ABSTRACT

A pulse generating system for providing firing pulses to selectively trigger solid state control devices connected to a three-phase A.C. line system, and more specifically to trigger said devices in selected relation with respect to the phase and frequency of the A.C. line.

4 Claims, 7 Drawing Figures

PULSE GENERATING SYSTEM

DESCRIPTION

1. Technical Field

A pulse generating system which is connectible to receive a synchronizing signal from a three-phase system and to provide firing pulses in desired relation to the phase of said synchronizing signal such as for selectively triggering control circuitry connected to said system.

2. Background and Prior Art

Large horsepower variable speed A.C. and D.C. motors have been used in many industries for years. The advent of high power, solid state switches (thyristors) has made it possible to build many new types of variable speed controllers with increased sophistication and reliability. To properly control these variable speed motors requires electronic circuitry that accurately generate sequential gating signals to the thyristors. These circuits are often referred to as firing circuits and exist in both analog and digital form.

Earlier firing circuits were usually analog in circuit operation and obtained their phasing information from an A.C. sinusoidal voltage derived from the A.C. power source. The generating of gating signals was accomplished by sensing when the A.C. voltage passed through zero. This zero crossing could be advanced or retarded with respect to the A.C. line by introducing a positive or negative D.C. bias as required. These circuits were capable of providing the necessary gating signal but were somewhat inflexible, sensitive to disturbances on A.C. lines, and had to be duplicated for each phase of the three-phase system. The increasing availability of digital logic components has recently spurred the development of digital firing circuits. The digital circuits are advantageous in that they are usually more flexible in design application, less sensitive to noise conditions, and are capable of generating all the necessary gating signals from one phase of a three-phase source.

Existing digital firing circuits are usually very similar in operation. A digital representation of the A.C. line voltage is first obtained by means of a phase lock loop circuit technique which is well-known in the art. This circuit will divide the A.C. line cycle into a predetermined number of increments or bits. An analog signal that is representative of the required phase angle shift is also converted to a digital representation by means of an analog digital converter (A/D converter) or voltage-to-frequency converter (V/F converter). These two signals are then processed so as to generate the required gating signals. The processing of these digital signals has been accomplished by the use of counters or registers to control the phase angle delay. While this means is adequate, it often requires much circuitry and proposes some difficulty when it is necessary to both advance and retard the gating signals with respect to the A.C. line. The inventive firing circuits (pulse generator) consists of a unique means of processing these signals so as to accurately advance or retard the required gating signals (firing pulses) with minimum circuitry.

One ideal application for this type of firing circuit is variable speed drives of the large A.C. pump motor type, wherein the motor is operating at less than maximum speed a substantial period of time which will result in a loss of energy since the amount of energy available to the motor must of necessity be of such a level that is equivalent to operation at maximum speed.

Quite recently, systems have been developed wherein the energy that is not being consumed when the motor is operating at less than full speed, is returned to the energy source and reused to reduce the overall energy utilization.

One such system that is presently being used was developed by the assignee of the present invention and is a solid state recovery system that is incorporated into the power circuit for a motor. Essentially, the primary windings of the variable speed motor are energized from an A.C. three-phase power supply and the secondary windings of the motor are connected to a rectifier bridge where the motor rotor potentials are converted from an A.C. power to a D.C. power. The D.C. power is then fed through a filter reactor, which forms part of the drive protective system, to a line-commutated converter-inverter which converts the D.C. power to an A.C. power that is at the same frequency and voltage as the output from the secondary winding of the motor. This converter power is then transmitted back to the incoming power lines to make more effective use of the overall power transmission capability of the entire system.

Since these systems are normally used at a remote location and are operated without attendants, provision must be made for the system to be capable of overcoming transient electrical disturbances which may appear on the incoming power feed lines or may be radiated to the drive system from external sources. These disturbances can cause faults to occur in the power line-commutated inverter which can cause large current surges in the power circuit that can damage the equipment. In secondary power recovery circuits, it was determined that during a fault caused by transient electrical disturbances, the energy from the motor and the energy from the power supply combine to form a continuous current flow through the power circuit resulting in a rapid build-up of the current to a point where the circuit breakers are opened within the drive system. This means that the system will automatically shut down and will require manual reactivation.

A fault clearing mechanism is incorporated into a power recovery drive system for a variable speed motor driven from an A.C. power source which has primary and secondary windings respectively connected to the source and to a rectifier bridge which converts the A.C. potential to a D.C. voltage that is fed into an inductive reactor with a solid state inverter in series with the inductive reactor. The solid state inverter converts the D.C. voltage to an A.C. voltage output which is returned to the A.C. source.

The fault clearing mechanism consists of a solid state switch means incorporated into the rectifier bridge and a current level sensing means electrically coupled to the output of the solid state inverter which senses the increase of the current from the inverter, which may result from a fault, and provides a representative signal of a current increase above a preselected level.

The representative signal is fed to the pulse generating system of the present invention which processes said signal and as one output. The inventive pulse generating system provides firing pulses in selected relation in the three-phase converter bridge. Selectively, a short can be provided across a rectifier bridge to drop the A.C. voltage to zero. When the D.C. voltage drops to zero, the inductive reactor operates to absorb and buffer at least one full cycle of A.C. voltage without saturation, such that the fault energy is dumped back into the main power source enabling the inverter current to drop to substantially zero and allow these faults to clear.

The inventive pulse generator was specifically developed for use with an A.C. pump control; however, it should be understood at the outset that the pulse generating system of the present invention is useful in various other applications.

SUMMARY OF THE INVENTION

The inventive pulse generating system may be used to provide the firing pulses that trigger the thyristors in a three-phase rectifier disclosed in U.S. Pat. No. 4,308,491 issued Dec. 29, 1981 incorporated herein by reference, in the name of F. C. Joyner, et al, entitled AUTOMATIC FAULT PROTECTION SYSTEM FOR POWER RECOVERY CONTROL, assigned to the same assignee as the present invention, now U.S. Pat. No. 4,308,491. The pulse generating system also provides an "end stop" signal that indicates an input reference signal has reached certain preselected limits set such as by manual switches. The pulse generator receives its synchronizing signal which is a line-to-line voltage through a high impedance connected to the incoming power lines. The reference signal input (Analog In) which determines the magnitude of the phase angle is supplied by associated circuitry. The direction, that is the advance or retard, of the phase angle is determined by an Add/Subtract input logic level supplied by associated circuitry.

The pulse generator also provides an output which indicates that the difference between the system zero crossing and the firing circuit zero is greater than 3.75 degrees, which thus insures that an internal phase lock loop circuit is in proper synchronization with the A.C. line voltage.

The inventive pulse generator will also provide high frequency clock signals necessary to convert the firing pulses to square wave signals capable of gating the inverter thyristors of the circuit disclosed in the aforesaid patent application.

The foregoing features and advantages of the present invention will be apparent from the following more particular description of the invention. The accompanying drawings listed hereinbelow are useful in explaining the invention wherein:

BRIEF DESCRIPTION OF SEVERAL VIEWS OF DRAWINGS

FIG. 1 is a block diagram of the inventive pulse generator assembly;

FIG. 2 (drawn on two sheets and labeled FIGS. 2a and 2b) is a circuit diagram of the apparatus of FIG. 1;

FIG. 3 of the drawings discloses a prior art type of adjustable speed control circuit with a power recovery control incorporated therein;

DETAILED DESCRIPTION OF THE INVENTION

Figure 1:
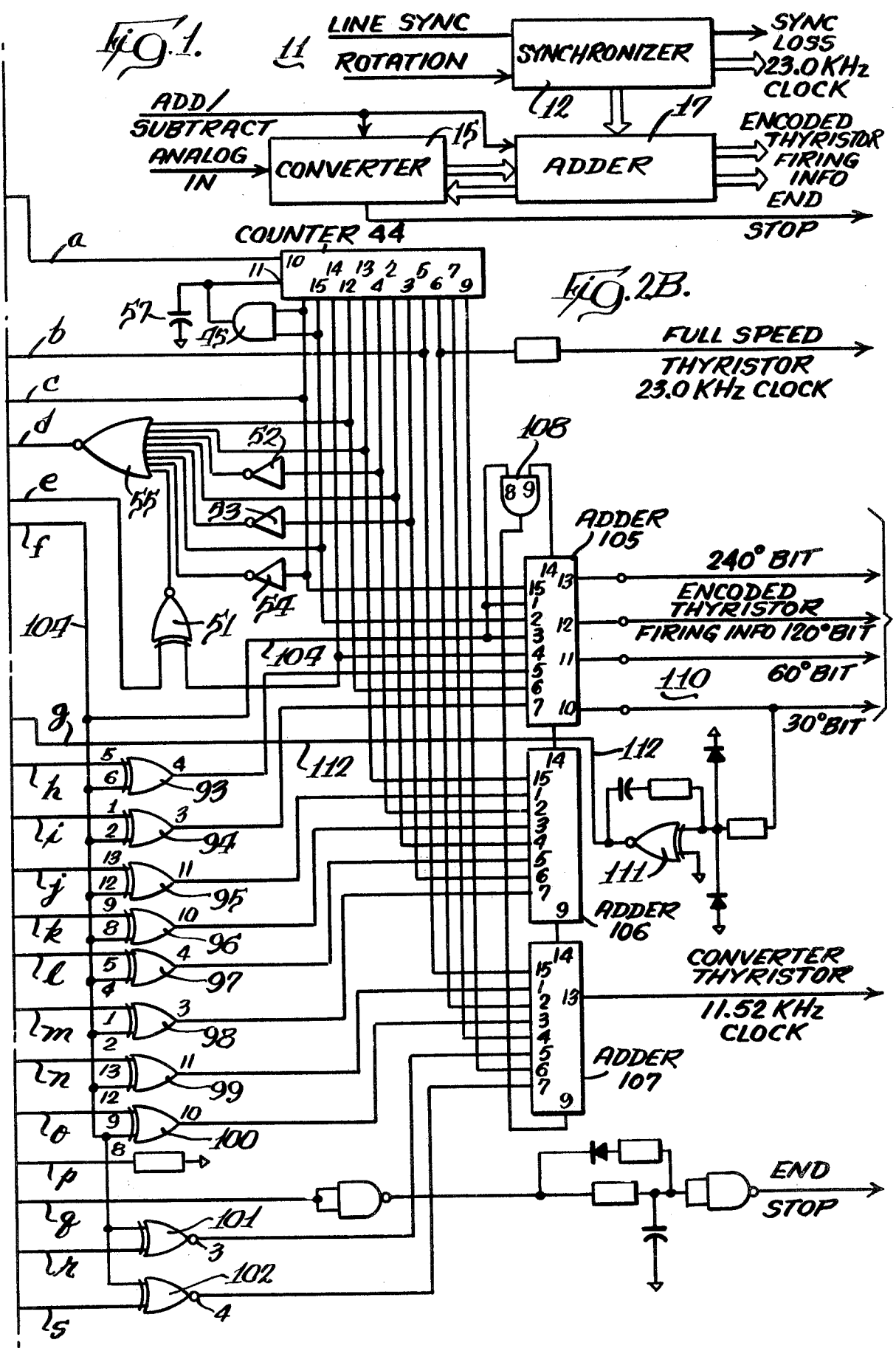

As shown in the block diagram of FIG. 1, the inventive pulse generator assembly comprises a synchronizer 12, a converter 15, and an adder 17. As will be described more fully herein below, the synchronizer 12 locks or refers the firing pulses to the phase of the three-phase system line voltage, and divides the A.C. voltage cycle into equal parts of 0.1172 degrees/count which is described by a 12-bit binary word. The converter 15 converts the analog input into a 10-bit binary word with directional information which indicates phase angle advance or retardation. The adder 17 is a novel approach of processing the digital information obtained from the synchronizer and converter. The adder is used to generate sequential, digital and coded outputs which are in synchronization with the A.C. line. The outputs can be advanced or retarded with respect to the A.C. line and are decoded to provide the proper thyristor gating signals. The adder 17 generates this information by adding or subtracting the 10-bit binary word from the converter with the 12-bit binary word from the synchronizer. Therefore, the adder 17 adds or subtracts the 10-bit binary word from the converter to the 12-bit binary word from the synchronizer and provides 12 bits of encoded data. The adder provides data bits to a decode driver to generate thyristor gating signals.

FIGS. 2a and 2b in side-by-side relation positioned on two separate sheets, comprise a circuit diagram of the structure of FIG. 1. For convenient reference, and positioning of the drawings, the leads extending from FIG. 2a and 2b have been labeled a-s, and the leads in FIG. 2b corresponding respectively thereto have been also labeled a-s.

In FIG. 2a, a sinusoidal waveform 18 (line sync.) representative of the A.C. power line frequency with which the firing pulses must synchronize is coupled to terminal 20. The line sync. voltage is first passed through a low pass filter 21 comprising resistors 22, 23 and 24, capacitors 26 and 27, and IC operational amplifier 25. The filter 21 has a cut-off frequency of about 500 Hz. The parameters of the filter 21 components were chosen to give a minimum overshoot and a phase shift or delay of eight degrees.

The output of the filter 21 is fed into a signal conditioner 30 comprising a resistor 28, inverting amplifier 31, and diode 33. Signal conditioner 30 converts the sinusoidal waveform into a rectangular pulse voltage with a positive amplitude equal to the saturation of the amplifier 31, and a negative amplitude equal to the clamping voltage of diode 33. Noise immunity and filtering is provided by diode 34, and resistors 35, 36 which provide unidirectional hysteresis. The hysteresis effect forces the input to go to +1.8 V before the output switches low, and causes the trailing edge to stretch out by ten degrees with a 6 VAC input.

Gate 37 and positive feedback voltage resistors 40 and 41, are connected to form a Schmitt trigger which produces a fast rising waveform. A diode 42 connected to the input of gate 37 prevents negative voltage input to gate 37. Gate 37 couples to a phase comparator 43.

The output of phase comparator 43 is coupled to the clock input of a binary counter 44 which produces twelve (12) bits of binary coded information. Each of the twelve bits corresponds to a number of counts; for instance, counter 44 pin (1)=2048, counter pin (15)=1024, etc. Note that And gate 45 connected to pins 1 and 15 will decode the number 3072; and the output of gate 45 is connected to a reset counter 44 after 3072 counts. Accordingly, this divides the line sync. cycle (360 degrees) into 3072 equal increments of 0.117 degrees per count.

Nand gates 52, 53, 54 and Nor gate 55 decode the number 2128 when rotation lead 70 is at logic "1", and the number 2640 when rotation lead 70 is at logic "0". This decoded number effectively causes the "0" count or starting point to be advanced 249 degrees ahead of the line sync. zero crossing when rotation is logic "1". A logic "0" on rotation lead 70 advances the firing circuit by 60 degrees through Exclusive Nor gate 51 and Nor gate 55 coupling to pin 3 of comparator 43. The leading edge of the decoded number is compared in phase comparator 43.

Capacitor 56 connected to comparator 43, and capacitor 57 connected to counter 44 provide noise and race condition protection.

A dual 4-bit shift register 59, And gate 61 and inverter 62, combine to form a digital filter that monitors the timing error difference between the leading edges of line sync., and the delay count output from Nor gate 55. The shift register 59 produces a "0" output at its pin (10) when four successive clock pulses appear at its clock input pin (1) while reset is "0". During the time between leading edges, the phase error output pin (1) of comparator 43 is at "0" level which is used for the reset input pin (6) of shift register 59.

The shift register 59 clock input frequency is 192 x line sync. frequency ($F_s$). (The "x" is the multiplication of times symbol.) This sets the maximum timing error between edges equal to:

$$\frac{(1 \times 4)}{192 \times F_s} \text{ seconds}$$

before pin (1) switches from a "0" to "1". Shift register 59 uses the output from its pin 10 as the reset information for its pin 14. The clock input of register 59 is $1.5 \times F_s$; therefore, it must be in lock for:

$$\frac{(1 \times 4)}{1.5 \times F_s} \text{ seconds}$$

before register 59 output returns to "1". The output from register 59 pin (14) is inverted by inverter 61. The output of register 59 pin (2), and the inverted output from register 59 pin (14), are processed through And gate 62 for added security. The output of And gate 62 switches to "0" to inhibit the firing circuit during an out of sync. condition and provides a visual indication illuminating LED 63 which is connected from the output of gate 62 through resistor 64 to +15 V.

Figure 2:
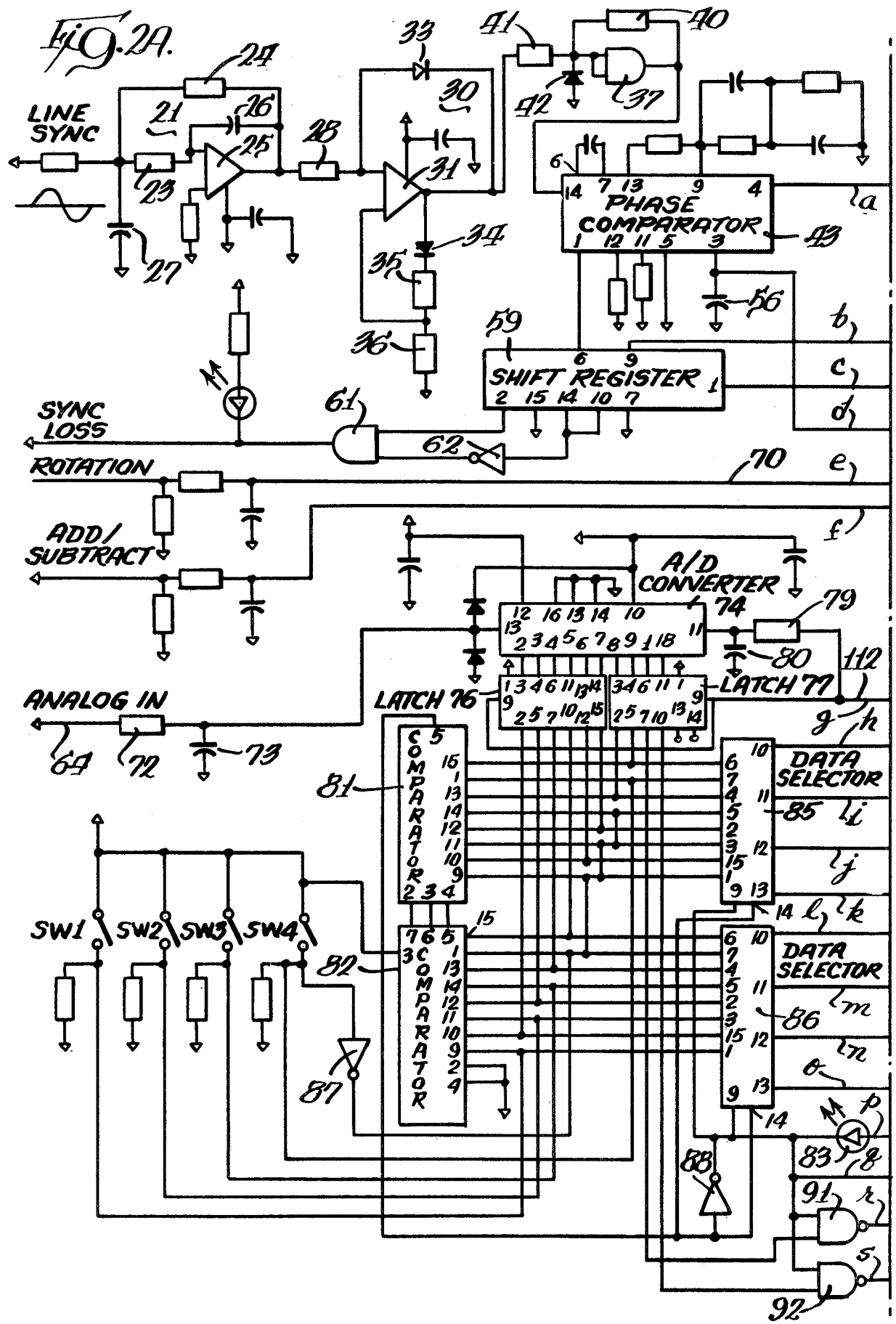
Figure 3:
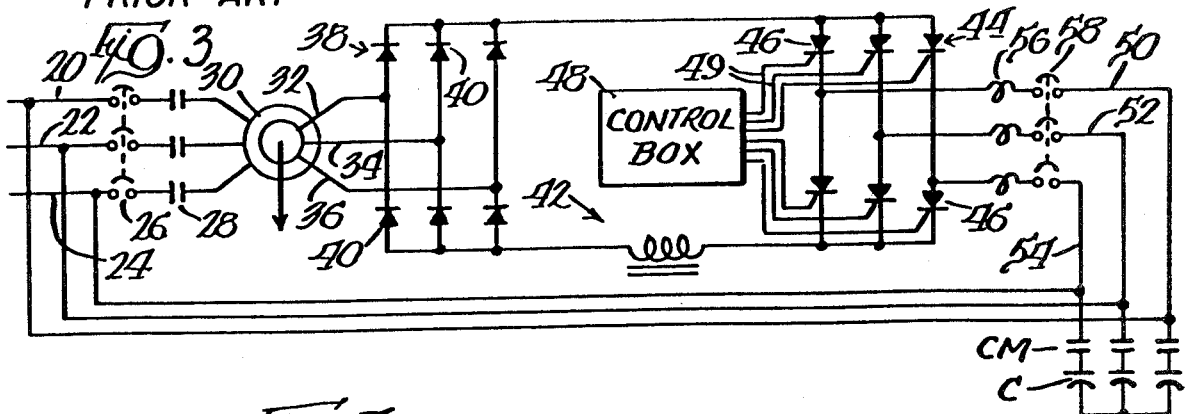
Figure 4:
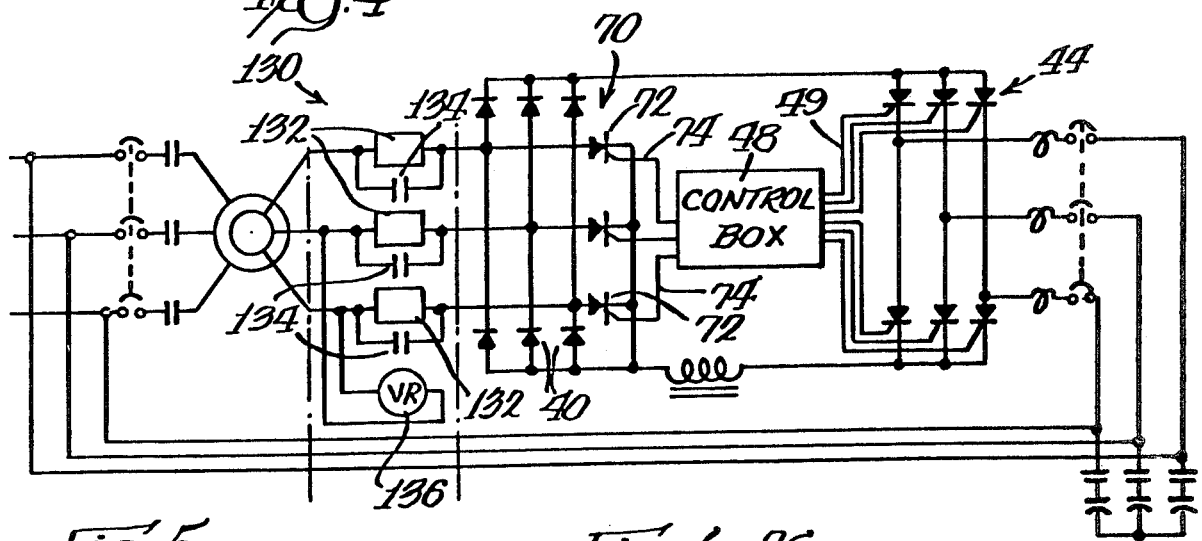
FIG. 4 is a circuit, such as illustrated in FIG. 3, modified in accordance with the teachings of the present invention and incorporating the pulse generator assembly in control box 48.
Figure 5:
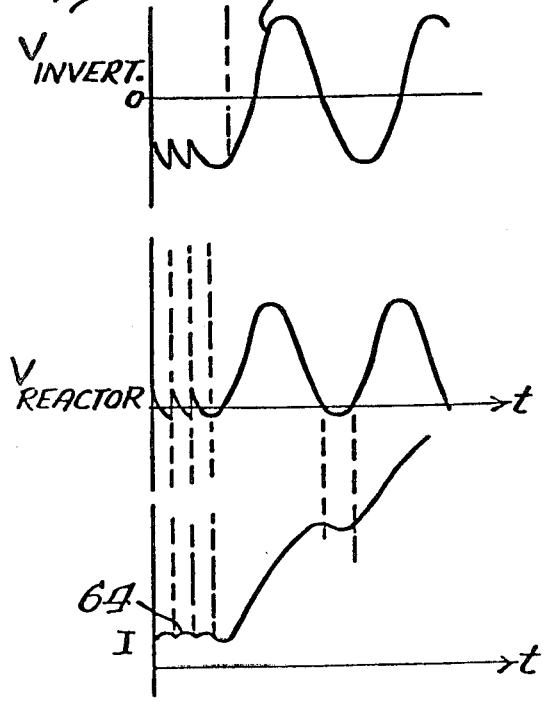
FIG. 5 is a graph showing the voltage and current plot when a fault occurs in the prior art system.
Figure 6:
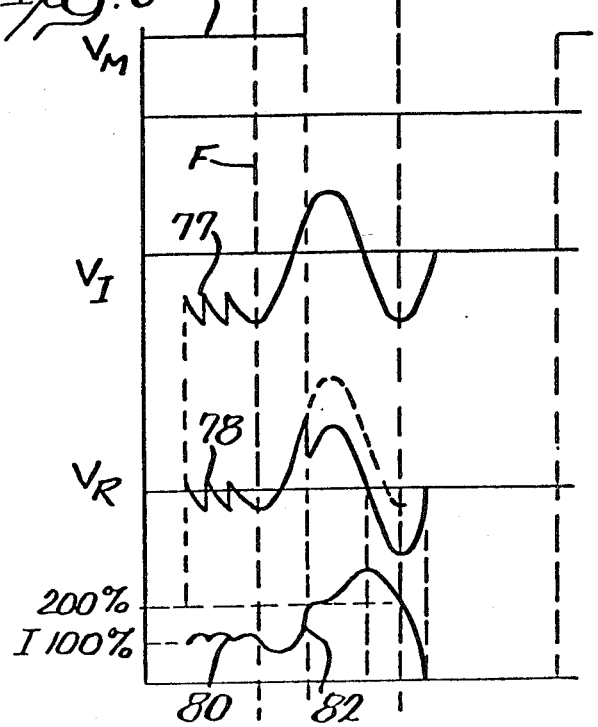
FIG. 6 is a view similar to FIG. 5 showing a graph of the voltage and current plot during a fault when the circuit is constructed in accordance with the present invention.

The circuit of FIG. 2 includes a converter which comprises analog to digital converter (A/D), a digital clamp, and a director. An "ANALOG IN" signal which can be from 0 V to 10 V representing a gating signal varying from 150 degrees to 90 degrees is coupled to terminal 64 and passes through a low pass filter formed by resistor 72 and capacitor 73, and is then coupled into the analog input of A/D converter 74.

Converter 74 is a successive approximation A/D converter with "three-state" outputs. As the blank and convert input is driven low, the "three-state" outputs will be open and a conversion will commence. Upon completion of the conversion, the data ready line will go low and the data will appear at the output after a delay of 500 nanoseconds. Pulling the blank and convert input high, blanks the outputs and readies the device for the next conversion. In approximately 24 microseconds, converter 74 executes a 10-bit binary coded conversion with no missing codes. Hex Type D Flip-Flops ICs 76 and 77 operate as digital latches. Data on the inputs of latches 76 and 77, (see pins 3, 4, 6, 11, 13, and 14) is transferred to the outputs of latches 76 and 77, (pins 2, 5, 7, 10, 12 and 15) on the positive edge of the clock pulse (pin 9). Therefore, a clock that occurs every 30 degrees, and lasts 30 degrees under steady state conditions, is applied to pin (9) of each of latches 76 and 77 which causes them to latch the data from the A/D converter's 74 previous conversion. The clock is delayed by approximately one microsecond and then applied to the blank and convert pin (11) of latches 76 and 77, to enable the latches 76 and 77 to transfer data before initiating a new conversion.

Resistor 79 and capacitor 80 provide the delay for the blank and convert input of converter 74. The binary coded output bits of latches 76 and 77 comprise one set of inputs for a digital clamp.

The 4-bit magnitude comparators 81 and 82 are cascaded to perform an 8-bit magnitude comparison of two binary coded words. The cascading inputs (A<B, pin 2; A=B, pin 3; A>B, pin 4) of the least significant comparator, 82, are connected to a low, a high and a low level, respectively. While the cascading outputs (A<B, pin 7; A=B, pin 6; A>B, pin 5) of comparator 82 are connected to the corresponding cascading inputs (A<B, pin 2; A=B, pin 3; A>B, pin 4) of the most significant comparator 81. One of the binary coded 8-bit words is applied to the "A" data inputs. The most significant bits are connected to pins 15, 13, 12 and 10 of comparator 81. While the least significant bits connect to pins 15, 13, 12 and 10 of comparator 82. The other binary coded 8-bit word is applied to the "B" data inputs. The most significant bits connect to pins 1, 14, 11 and 9 of comparator 81. The least significant bits connect to pins 1, 14, 11 and 9 of comparator 82. Therefore, when the 8-bit "A" data word is greater than the "B" data input word, the A>B (pin 5) output of comparator 81 switches high (the inactive normal state of pin 5 is low).

Switches SW1 through SW4, and IC 87 provide an 8-bit binary word for the "B" inputs. This word is designated "END STOP". A number of different binary word switch positions are thus obtained.

Eight of the most significant digits from the latches 76 and 77, provide the 8-bit word from the "A" inputs of comparators 81 and 82. The A>B (pin 5) output of comparator 81 switches to an active state high when the "A" input word exceeds the "B" input word. This indicates the A/D information has exceeded the value of "END STOP" determined by the switch settings.

The foregoing A>B output performs three functions. One is to indicate to external circuits that the analog information has exceeded the "END STOP", causing LED 83 to turn ON; resistor 84 limits the curent through LED 83. A second function of the A>B output is to produce a complementary output of itself with a delay of 660 ms before switching to a low state and a delay of 33 ms before switching high, its non-active normal state. The third function of the A>B output is to provide an input into quad two-channel data selectors 85 and 86 which causes them to switch the output from the "A" word to the "B" word and locks the two least significant digits of the "A" data word. The "A" data inputs are pins 6, 4, 2 and 15 on data selectors 85 and 86. The "B" data inputs are pins 7, 5, 3, and 1 on data selectors 85 and 86. Pins 9 of selectors 85 and 86 are connected to each other, as are pins 14. IC 88 inverts the A>B output of comparator 81 and connects to pin 9 of both selectors 85 and 86. Pins 14 of selectors 85 and 86 are connected directly to the A>B output and are thus non-inverted. A high input to the "A" control input of both selectors 85 and 86 causes the "A" data input to appear at the output, (pins 10, 11, 12 and 13) of selectors 85 and 86. Selector 85 processes the most significant bits and selector 86 processes the least significant bits. A low level from the A>B output of comparator 81 provides a high to "A" control input and a low to "B" control input. This transfers the "A" data to the outputs of selectors 85 and 86. A high level from the A>B output of comparator 81 transfers the "B" data to the outputs of selectors 85 and 86. The effect of this circuit is to switch from the analog input data to the "END STOP" information. This limits the analog information to a preset value by means of a digital clamp.

Nand gates 91 and 92 connected to pin 9 of each of selectors 85 and 86 also form a part of the digital clamp for the two least significant bits. During normal operation gates 91 and 92 invert its inputs. Once the "END STOP" has been reached, gates 91 and 92 outputs are forced to a high state.

The director circuit comprising exclusive Or gates 93-100 manipulate the digital clamp's output causing the advancement or retarding of the firing angle. Or gates 93-100 comprise "quad two input exclusive Or" gates. The directors' control input is an "ADD/SUBTRACT" line 104. The eight most significant digits are fed into pins 5, 1, 13 and 9 on Or gates 93-100. The control input pins are 6, 2, 12 and 8 which are controlled by the input signal "ADD/SUBTRACT" line 104. When the "ADD/SUBTRACT" input is low, the "exclusive Or" is in a non-inverting mode which simply passes the input data to the outputs, unaffected. When the "ADD/SUBTRACT" input is in a high state, the input data is inverted. The output pins 3, 4, 10 and 11 of gates 93-100 form the eight most significant digit inputs for the adder circuits, to be discussed. The two least significant digits are fed into pins 2 and 6 of Exclusive Nor gates 101 and 102.

The control inputs to Or gates 93-102 are pins 1 and 5 on selector 85 which in turn, controlled by the "ADD/SUBTRACT" input on line 104. In a low state, the "ADD/SUBTRACT" line 104 inverts the input data. When the control input is high, the input data is non-inverted and simply passed through to the output pins 3 and 4 of gates 101 and 102. The eight outputs from Or gate 93-100 plus the two outputs from Or gates 101 and 102 form the ten bits of information from the converter section; these ten bits contain the magnitude and direction information for the firing circuit, phase shift and are the link between the converter section and the adder section generally labeled 110 and comprising ICS 105, 106 and 107.

The adder 110 performs an addition, or 1's complement subtraction operation, on two, 12-bit binary words. This is achieved by cascading three 4-bit full adders, 105, 106 and 107. The "carry-out" output is tied to the "carry-in" input of the more significant adder for both adders 106 and 107. The carry-out output of adder 105 is fed into one input of the And gate 108. The output of gate 108 is connected to the "carry-in" (pin 9) of adder 107. By controlling the other input (pin 8) of And gate 108, the "carry around" operation is controlled. Gate 108 pin 8 is controlled by the "ADD/SUBTRACT" input on lead 104.

When in the addition mode, the "ADD/SUBTRACT" input is low which inhibits a "carry around". The outputs from the converter are not inverted. In this state, the 4-bit adders 105, 106 and 107 perform a standard binary addition of 12 bits.

With the "ADD/SUBTRACT" high, the "carry around" operation is possible and the converters' output is inverted providing a complemented number. In this mode, the adder performs a 1's complement subtraction. One output generally labeled 110 is a group of four bits designated as the "240-degree, 120-degree, 60-degree and 30-degree" bits. These four bits are decoded on a suitable decode/drive circuit for suppying the timing information for six SCRs spaced 60 degrees apart electrically.

Note the 30-degree bit output supplied by the adder section is coupled back through Exclusive Nor gate 111 and lead 112 to initiate a new conversion in the converter section. Another output, from pin 13 of adder 107 supplies a clock signal equal to 192 times the line frequency for the decode/driver circuit which generates a "picket fence" pulse for gating the thyristors.

The functional operation of the circuitry of FIGS. 1 and 2 can be summarized as follows.

The synchronizer 12 functions to (a) synchronize the firing circuit to zero crossing of line sync. input (shifted for 30 converter); (b) adjust synchronization as required by phase rotation; (c) divide 360 degrees into 3072 counts with 1 count=0.117 degrees; and, (d) provide clock output for generating picket fence gating signals.

The synchronizer also monitors phase lock loop comparator error and generates out-of-lock signal when phase margin exceeds 3.75 degrees.

The converter 15 functions to (a) convert the analog voltage into 10 bits of digital information; and, (b) convert 10 bits from a positive to negative number as required for proper advance or retard of firing angle.

The converter 15 also provides a digital "END STOP" for limiting the magnitude of digital information into the adder. This magnitude is set by SW1–SW4 and limits the maximum firing angle advance or retard. It also produces an output indicating that the maximum "END STOP" magnitude has been reached.

The adder 17 functions to (a) add two sets of digital information providing a series of encoded outputs which are used to properly sequence and time thyristor gating; (b) provide high frequency (192×line frequency) clock for generating thyristor gate pulses; and (c) provide outputs to coordinate initiation of the A/D conversion and firing of converter thyristors.

As mentioned above, the "END STOP" output indicates the Analog In reference signal at terminal 64 has reached the limit set by switches SW1–SW4. The switches SW1–SW4 may be set in various combinations, to provide an 8-bit binary code input into comparator 82 and selector 86; and, the magnitude of shift limit varies from a condition when all the switches SW1–SW4 are open (and the shift is 56.25 degrees) to a condition when all the switches SW1–SW4 are closed and the shift is 63.28 degrees.

While the invention has been particularly shown and described with reference to a preferred embodiment thereof, it will be understood by those skilled in the art, that various changes in form and details may be made therein without departing from the spirit and scope of the invention.

We claim:

1. In a pulse generating system for a variable speed motor driven from a power source feeding a three-phase A.C. power line system, said motor having primary and secondary windings and with said source connected to said primary winding and solid state rectifier bridge means connected to said secondary winding to produce a D.C. voltage, said bridge means having solid state switch means for each power line, a solid state inverter connected to receive said D.C. voltage and provide an A.C. voltage output connected to transmit power back to said power source, an inductive reactor connected intermediate said bridge means and said inverter, control means for energizing said switch means and controlling said inverter, the improvement of said control means including a pulse generator connected to receive a synchronizing signal from said power lines dependent of the A.C. frequency, means for receiving a phase reference signal of a magnitude dependent on the difference in phase between the A.C. line voltage and a selected phase angle, logic means for determining the selected advance and retard of said phase angle of said reference signal relative to said synchronizing signal, and adder means for processing and converting said signals to digital outputs for initiating firing pulses to said solid state switch means in selected relation.

2. A system as in claim 1, wherein said pulse generator includes input signals to cause said pulse generator to be insensitive to phase rotation of the A.C. input line frequency.

3. A pulse generator for use such as with control circuitry for a three-phase A.C. input line system and for providing firing pulses to solid state switches in said control circuitry connected to respective input lines comprising, in combination, a synchronizer, a converter and a digital adder, said synchronizer receiving synchronizing input dependent on the A.C. input frequency and an input dependent on the phase rotation of the three-phase frequency, said synchronizer providing a synchronizing loss signal, a clock output and digital data to said adder, said converter receiving a variable gating signal dependent on the phase rotation input and synchronizing loss signal, said converter and adder selectively processing said received signals and data to provide encoded firing information to said control circuitry to fire said solid state switches selectively and in selected relation to the phases of the A.C. line frequency on each of said input lines.

4. A pulse generator as in claim 3, wherein said adder provides clock pulses for selected ones of said solid state switches.

* * * * *